United States Patent
Brandsma et al.

[11] Patent Number: 5,898,298
[45] Date of Patent: Apr. 27, 1999

[54] INDUCTOR/CAPACITOR-BASED MEASURING SYSTEM FOR A MOVING BODY

[75] Inventors: Arjen Brandsma, Tilburg; Hendrikus Willem Groot Hulze, Geldrop, both of Netherlands

[73] Assignee: Van Doorne's Transmissie B.V., Tilburg, Netherlands

[21] Appl. No.: 08/741,106

[22] Filed: Oct. 30, 1996

[30] Foreign Application Priority Data

Oct. 30, 1995 [NL] Netherlands ............... 1001524

[51] Int. Cl.⁶ ............... G01R 27/26; G01L 5/10
[52] U.S. Cl. ............ 324/71.1; 324/652; 324/655; 324/662; 324/682; 340/676; 73/862.194
[58] Field of Search ............... 324/654, 658, 324/660, 668, 675, 682, 686, 326, 652, 655; 340/675, 676, 677; 73/514.32, 718, 724, 780, 862.337, 862.194, 862.453, 862.26, 304 C, 774, 779, 862.332

[56] References Cited

U.S. PATENT DOCUMENTS

| | | | |
|---|---|---|---|
| 2,836,792 | 5/1958 | Weber | 324/686 |
| 2,852,739 | 9/1958 | Hansen | 324/668 |
| 2,925,590 | 2/1960 | Boltinghouse et al. | 324/660 |
| 3,312,892 | 4/1967 | Parnes | 324/660 |
| 3,418,571 | 12/1968 | Isoda et al. | 324/682 |
| 3,609,735 | 9/1971 | Dauterman | 324/664 |
| 3,784,897 | 1/1974 | Norrie | 324/660 |
| 3,906,340 | 9/1975 | Wingfield et al. | 324/682 |
| 4,862,088 | 8/1989 | Etienne et al. | 324/326 |

FOREIGN PATENT DOCUMENTS

| | | |
|---|---|---|
| 0 467 643 | 1/1992 | European Pat. Off. . |
| 2 365 785 | 4/1978 | France . |
| 25 11 413 | 9/1976 | Germany . |
| 27 36 595 | 6/1978 | Germany . |
| 2 111 684 | 7/1983 | United Kingdom . |
| 2 142 146 | 1/1985 | United Kingdom . |
| 2 183 842 | 6/1987 | United Kingdom . |
| 2 267 973 | 12/1993 | United Kingdom . |

OTHER PUBLICATIONS

A. Corry et al., "Measurement of Individual Conductor Tension During Pipe–Type Cable Installation", IEEE Transactions on Power Apparatus and Systems, vol. PAS–88, No. 5, May 1969, pp. 558–565.

*Primary Examiner*—Diep N. Do
*Attorney, Agent, or Firm*—Young & Thompson

[57] ABSTRACT

A measuring system measures forces, deformations, and movements. The measuring system comprises at least one LC-circuit, at least one power supply for generating a voltage and a current in the LC-circuits, whereby the frequency, the amplitude, and the phase difference between the current and the voltage in a default situation are known and are furthermore a function of the variable to be measured, as well as at least one detection unit for detecting the frequency and/or the phase difference and/or the amplitude in the LC-circuit. The invention provides therewith a compact, simple and multifunctional measuring system by means of which a reading of the measured value is possible without contact with the subject.

29 Claims, 5 Drawing Sheets

INDUCTOR/CAPACITOR-BASED MEASURING SYSTEM FOR A MOVING BODY

BACKGROUND OF THE INVENTION

The invention relates to a system for measuring forces, deformations and movements which appear in dynamic endless organs such as driving belts, driving chains, transmission belts, conveyor belts etc, comprising at least one sensor attached to the endless organ.

A measuring system of this type is for instance known from GB-2,267,973 and GB-2,142,146.

The system described in GB-2,267,973 is specifically embodied for measuring forces within a metallic endless V-shaped transmission belt. The system comprises a transmitter which is mechanically connected to the transmission belt and electrically connected to the sensor. Furthermore, a battery is mechanically connected to the endless belt and electrically connected to the transmitter and the sensor to supply power to these components.

The system described in GB-2,142,146 is embodied for measuring tensile forces within a conveyer belt. For that purpose the conveyer belt is adapted by. installing a measuring section within the belt. The measuring section comprises one or more sensors, a transmitter circuit for transmitting the measured signals and a battery for supplying power to both the transmitter and the sensors.

The use of transmitters is considered as a serious disadvantage because these transmitters are relatively voluminous, and need a power source in the form of an accumulator or battery which is also attached to the endless organ. The battery itself is not only a voluminous component itself but needs to be changed or reloaded from time to time. Furthermore, the mass of the measuring system will have influence on the functioning thereof certainly if the endless organ is moving at higher speed and the resulting centrifugal forces acting on the measuring system will increase.

SUMMARY OF THE INVENTION

The object of the invention is now to provide a compact, simple and multifunctional measuring system whereby reading of the measured values without contact with the subject is possible.

In agreement with the object the invention now provides a measuring system of the type specified above, whereby according to the invention the system comprises furthermore

- a measuring coil consisting of an electrical conductor mechanically attached to the endless organ, the coil being electrically coupled to the sensor,
- a capacitor mechanically attached to the endless organ and electrically coupled to the measuring coil together forming an LC-circuit and
- a detection circuit including a stationary detection coil which is inductively coupled to the measuring coil.

The measuring system according to the invention is compact, simple and multifunctional whereas detection of the variable to be measured is possible without making contact with the subject to be measured. This is highly desirable for measurements on dynamic subjects. In case according to the invention the capacitor of the LC-circuit has a dielectric constant which changes as function of the variable to be measured, or in case the LC-circuit comprises a strain gauge, resistor or coil, which may function as sensor, then the sensor section of the measuring system on the subject to be measured may be very compact.

According to the invention the power unit of the measuring system may comprise a circuit and a source. By providing the source with a supply coil it is possible to connect the power supply of the LC-circuit in a wireless manner to the LC-circuit. This enables a large freedom in the location of the measuring system. Preferably, the source generates an AC current in the LC-circuit resulting into a proper phase correlation between the voltage and current in the LC-circuit. More specifically, the AC voltage is sinusoidal.

According to a further characteristic of the invention the detection unit comprises a detection coil. Therewith the detection unit can be located in a contactless manner in relation to the LC-circuit and may read the variable remotely from the LC-circuit. This is highly desirable for carrying out measurements on dynamic subjects. According to a further embodiment of the invention the power supply coil and/or the detection coil may have a circular shape enabling in a preferred manner the passing of the coil of the LC-circuit through the detection coil. This is especially useful in relation to endless subjects. The power supply coil and/or the detection coil also may comprise a core suppressing the mutual influence of the coils. The core may have a circular shape.

The measuring system according to the invention may comprise two or more LC-circuits. Thereby each LC-circuit may comprise its own power supply and/or detection unit to prevent mutual influence. In this manner more variables, whether or not of the same kind, can be measured. However, it is also very well possible to measure the LC-circuit in a sequential manner in which case no additional power supplies and/or detection units are necessary. According to the invention the LC-circuit may comprise in that case one or more rectifiers, such as diodes or transistors. Especially a high frequency measuring signal can be superposed on a low frequent AC voltage in the LC-circuit. Thereby, during a part of the low frequent period a LC-circuit is switched off because of the non-conducting action of the rectifier whereas during the remainder of the period another LC-circuit is switched off. According to another embodiment of the invention the LC-circuit may comprise two or more subsystems, each subsystem having a capacitor and a rectifier. In this manner only one coil in the LC-circuit is necessary, so that the system remains compact and enables still the measurement of more variables.

For application of the measuring system in combination with an endless subject, the measuring system is preferably characterized in that the coil of the LC-circuit comprises one or more windings and covers essentially the complete circumference of the subject. The coil of the LC-circuit is preferably located in and/or on the endless subject. This is especially practical in combination with dynamically, for instance rotating, endless subjects such as transmission belts, whereby application of the coil on the complete circumference of the endless subject, notwithstanding the dynamic movement of the subject, enables a continuous measurement. For installation of the coil of the LC-circuit in general the subject does not have to be adapted in a functional manner to obtain relevant measuring data.

In combination with a transmission belt whereby transversal elements are attached to one or more carriers, according to the invention the measuring system can be designed such that the sensors are attached to one or more of the transversal elements. In this manner measurements can be performed under dynamic circumstances, with rotating transmission belt and at a distance thereof without functionally influencing the transmission belt.

BRIEF DESCRIPTION OF THE DRAWINGS

The invention will now be explained with reference to the drawing. The drawing shows in:

FIG. 1b a phase difference/frequency diagram for the measuring system of FIG. 1a;

DETAILED DESCRIPTION OF THE EMBODIMENTS

Figure 1A:
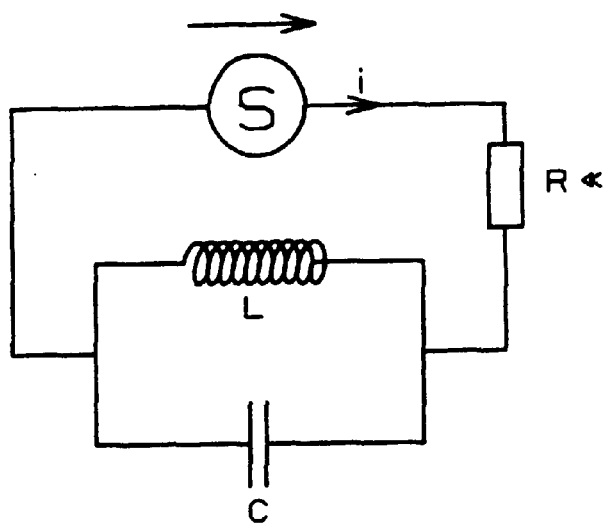
FIG. 1a schematically illustrates the principle of the measuring system according to the invention.
Figure 1B:
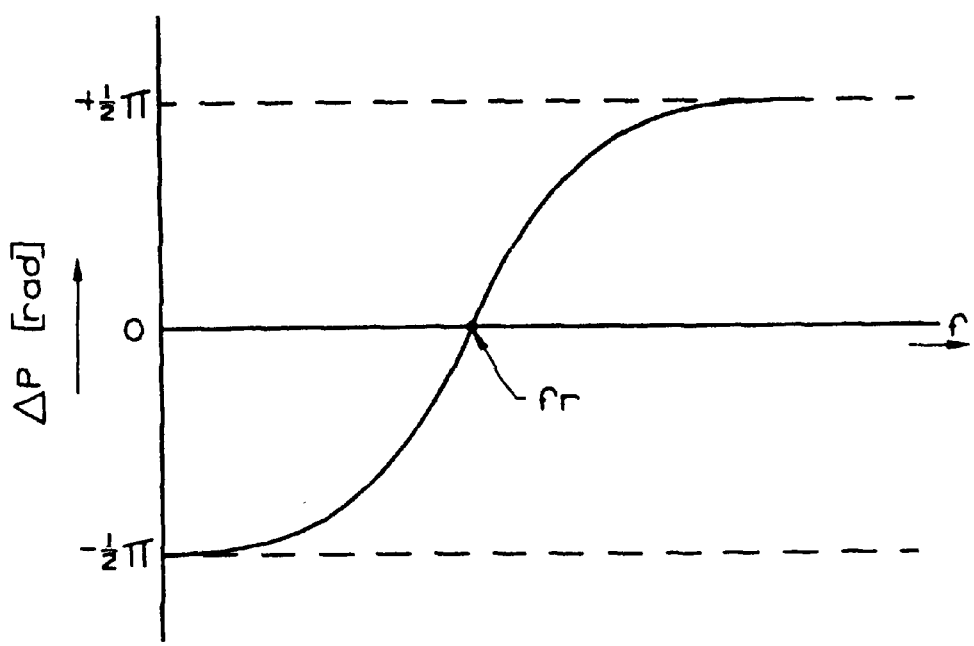

The measuring system illustrated in FIG. 1a comprises a power supply S having a resistor R, and generating a sinusoidal AC voltage in the LC-circuit, which comprises a capacitor C and a coil L. When current runs through the coil, this coil is a source of self-induction. At a high frequency the phase of the current will lead with 90° in relation to the voltage because in that case the capacitance is dominating. At a low frequency, however, the phase of the current will be delayed by 90° in relation to the voltage because in that case the inductance is dominating. This is illustrated in FIG. 1b whereby the phase difference ΔP is shown as function of frequency. At the frequency fr, the so-called resonance frequency, the phase difference equals 0. By definition the resonance frequency is that frequency at which the voltage and current are in phase.

Figure 9:
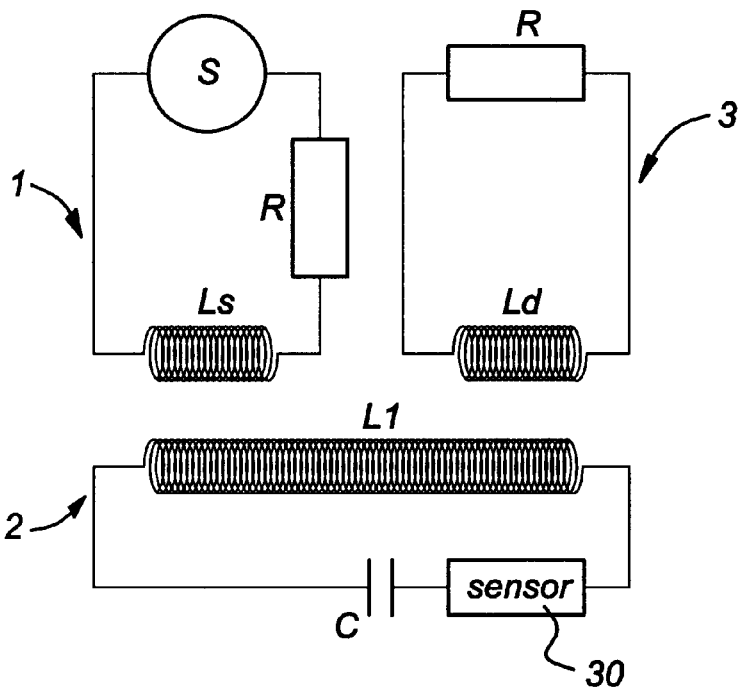
FIG. 9 illustrates an embodiment of the present invention, in which a sensor is used in addition to the capacitor and the coil.

This principle is used in the measuring system according to the invention by having the variables to be measured influence the LC-circuit in such a manner that the phase difference of the current, the voltage, and the amplitude are a function of the variable to be measured with a sensor. According to the invention the capacitor itself can function very well as sensor. In that case the capacitor has to be embodied such that the dielectric constant of the capacitor changes as function of the variable to be measured. By impression under influence of force, deformation or movement, the capacitor plates will move closer to one another or move from each other and/or mechanical stresses are created within the dielectricum of the capacitor resulting in a change of the dielectric constant and therewith in a phase difference in the LC-circuit. Alternatively, a strain gauge, a resistor or a coil, illustrates as sensor 30 in FIG. 9, may be applied in the LC-circuit in combination with a capacitor which is not sensitive to the variable.

Figure 2:
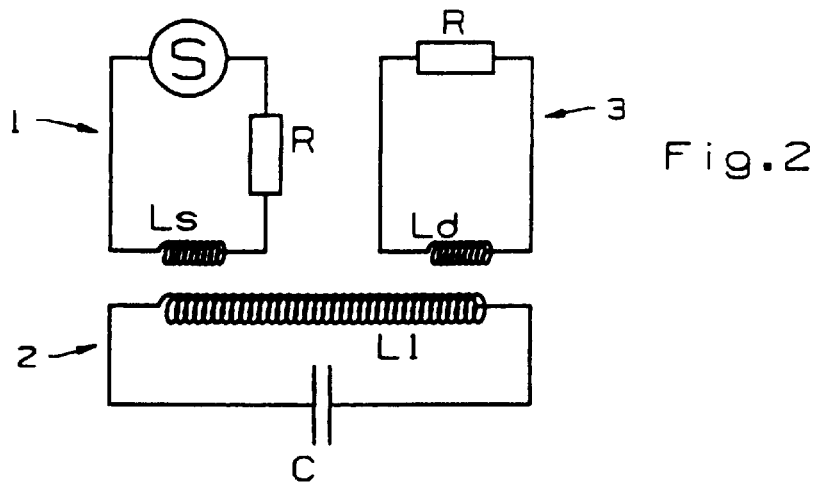
FIG. 2 illustrates a first embodiment of the measuring system according to the invention.

The first embodiment of the invention comprises a supply circuit 1 with power supply S, resistor R and supply coil $L_s$, as illustrated in FIG. 2. The power supply S generates preferably a sinusoidal AC current. The LC-circuit 2 comprises a detection coil L1 and a capacitor C of which the dielectric constant changes under influence of the variable to be measured. Furthermore, a detection circuit 3 is applied having a resistor R and a detection coil $L_d$. The supply circuit 1 with supply coil $L_s$ generates a magnetic field inducing a current in the LC-circuit 2. Because of the current in the LC-circuit a magnetic field is generated. This magnetic field in the LC-Circuit 2 causes a voltage in the detection circuit 3 with detection coil $L_d$. It will be clear that the magnetic coupling between power supply coil $L_s$ and detection coil $L_d$ has to be restricted as far as possible to prevent deterioration of the functioning of the LC-circuit. The power supply circuit, the LC-circuit, and the detection circuit are accommodated into one system, however, they are not directly in contact with each other. Therefore, the part of the system location the subject to be measured can be limited to the LC-circuit and therefore a compact and very simple measurement circuit is obtained, which is multi-functional and can be applied especially for measuring dynamic subjects.

Figure 3:
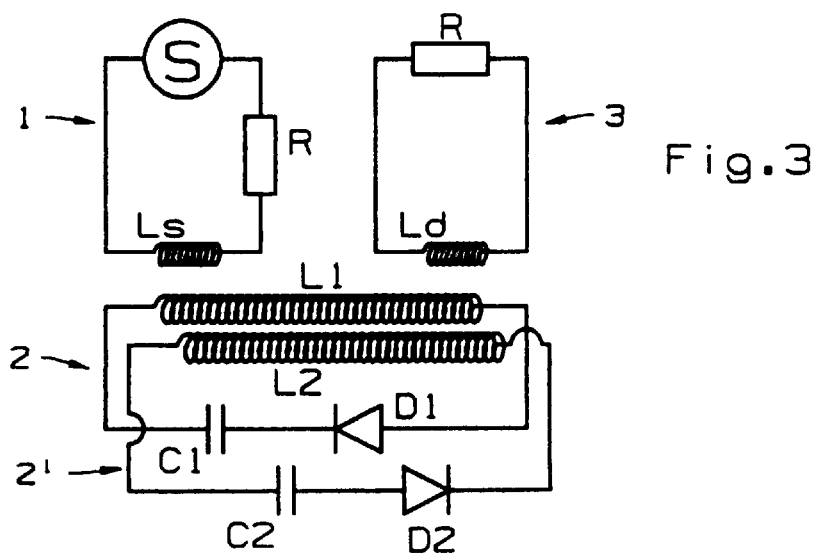
FIG. 3 illustrates a second embodiment of the measuring system according to the invention.

The embodiment of the invention according to FIG. 3 comprises again a power supply circuit 1 and a detection circuit 3. In this case two LC-circuits 2 and 2' are applied for sequentially measuring two variables, whether or not of the same kind. The LC-circuits 2 and 2' respectively have diodes D1 and D2 respectively. By superposing in the LC-circuit the high frequency measuring signal on a low frequency AC voltage during part of the low frequency period the one LC-circuit is switched off because the diode is non-conducting and during the remainder of the period the other LC-circuit is switched off. A restriction of this embodiment is that for both LC-circuits a separate coil is necessary. This is not necessary in the embodiment according to FIG. 4.

Figure 4:
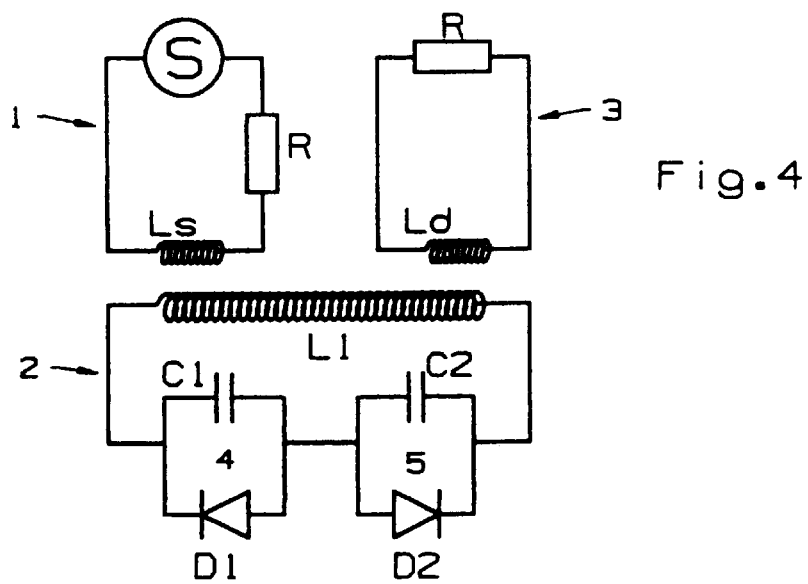
FIG. 4 illustrates a third embodiment of the measuring system according to the invention comprising two subsystems.

The embodiment according to FIG. 4 comprises, apart from the power supply circuit 1 and the detection circuit 3 one LC-circuit 2 with one single coil $L_1$ and two subsystems 4 and 5 respectively, each comprising a capacitor C1 and C2 respectively and a diode D1 and D2 respectively.

Figure 5:
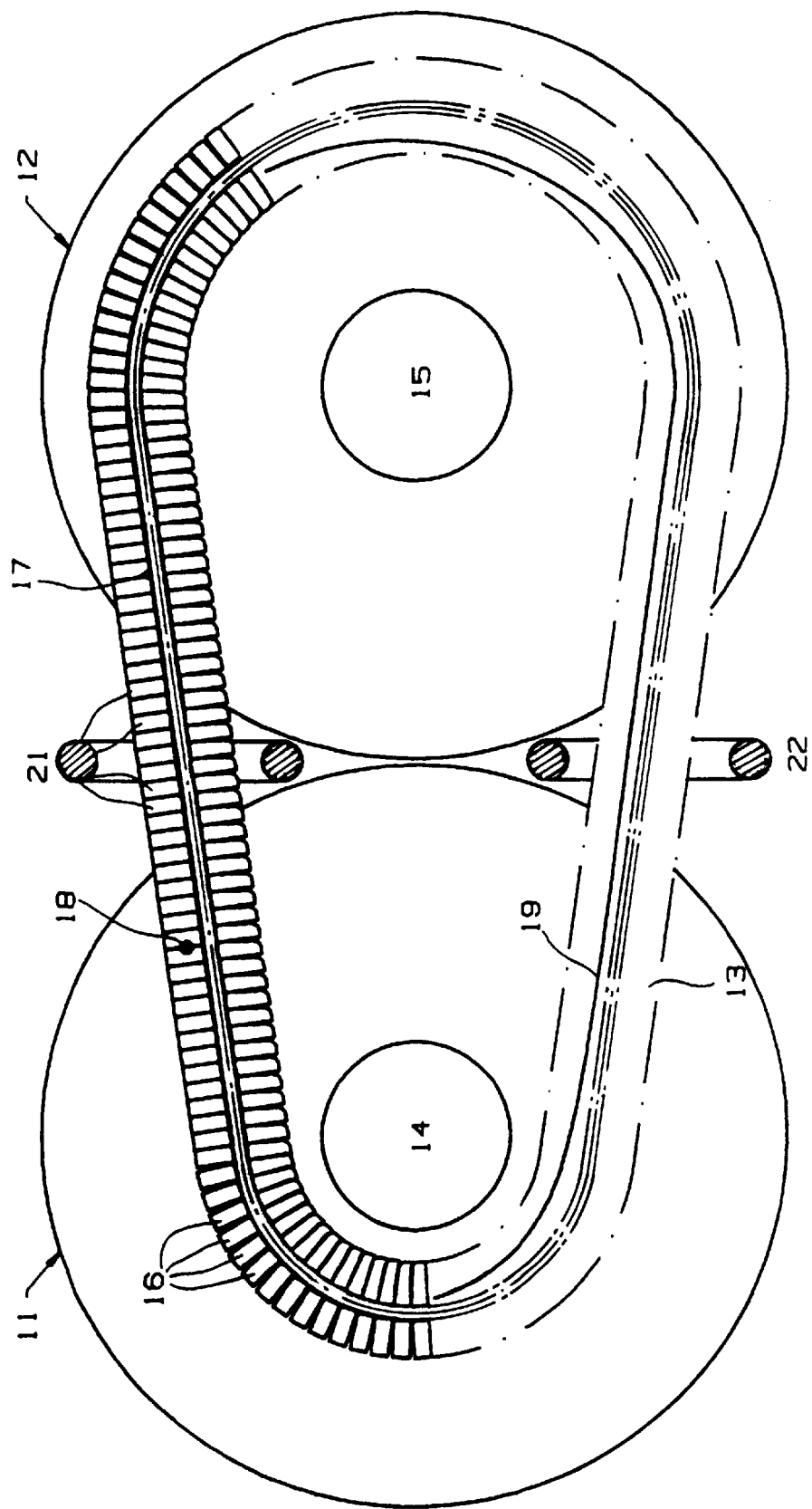
FIG. 5 schematically illustrates a transmission belt comprising a measuring system according to the invention.
Figure 6:
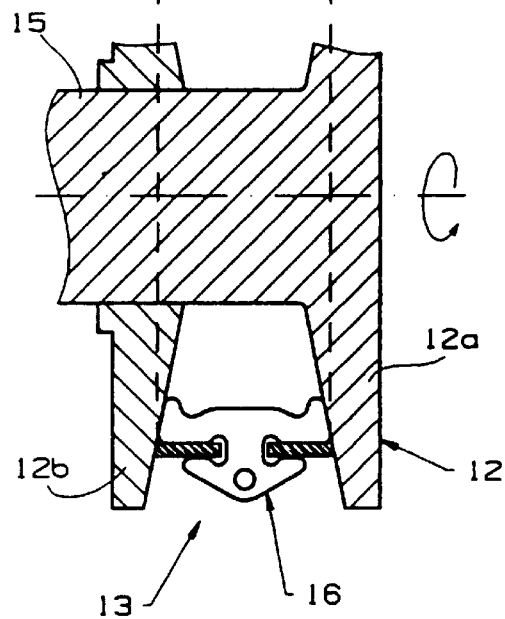
FIG. 6 schematically illustrates the transmission belt according to FIG. 5 in cross section.
Figure 7:
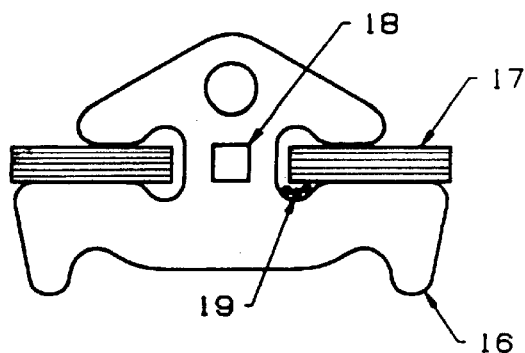
FIG. 7 schematically illustrates the transmission belt according to FIG. 5 in cross section, comprising a coil inside the transmission belt.
Figure 8:
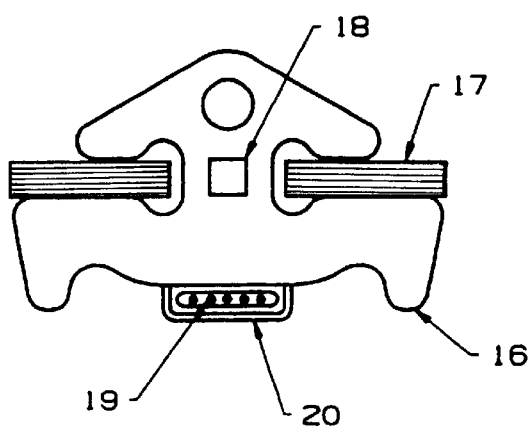
FIG. 8 schematically illustrates the transmission belt according to FIG. 5 in cross section and comprising a coil on the transmission belt.
Figure 10:
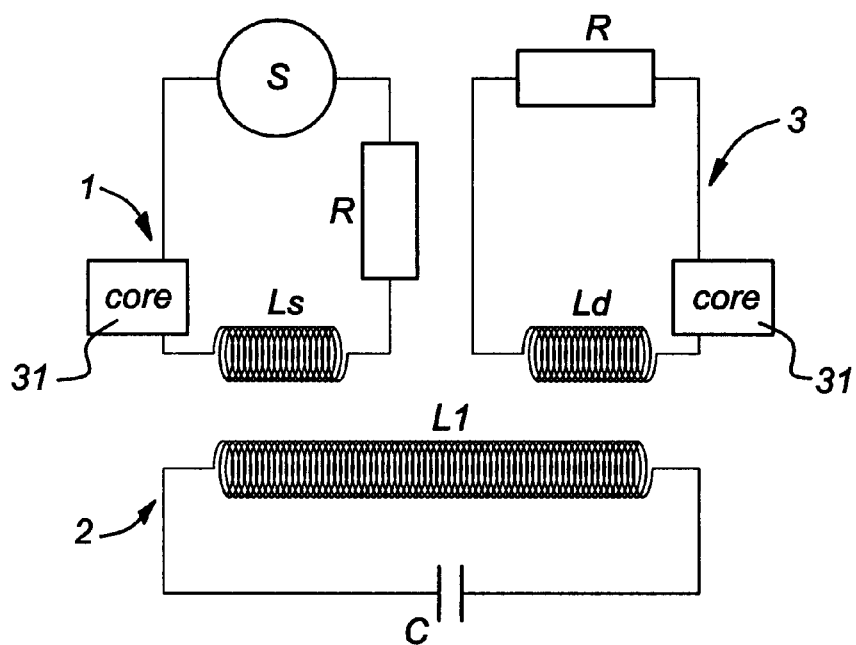
FIG. 10 illustrates an embodiment of the present invention utilizing cores with the supply and detection coils.

Because of the possible physical decoupling between power supply circuit, LC-circuit, and detection circuit, the measuring system is especially suited for measuring dynamic subjects, comprising rotating parts, especially transmission belts. In FIG. 5 a transmission belt 13 is illustrated which extends around the pulleys 11 with discs 11a and 11b and 12 with discs 12a and 12b. The discs 11a and 11b respectively 12a and 12b are mounted on the pulley shafts 14 and 15 respectively. The discs 11b and 12b are axially relocatable on their respective pulley axles by means of which the radial position of the transmission belt 13 between the pulleys and therewith the transmission ratio can be adapted. The transmission pelt 13 consists of two carriers 17 (FIG. 6) onto which a large number of transversal elements 16 are dislocatably attached. To be able to measure the fores between the transversal elements 16 a capacitor 18 is located at a suitable position on a transversal element. The coil 19 of the LC-circuit extends over the complete circumference of the transmission belt. The coil 19 is for instance located in an excavation of the transmission belt (FIG. 7) or located in clips 20 attached to the transversal elements (FIG. 8). Around the transmission belt 13 a power supply coil 21 and a detection coil 22 are accommodated. These coils 21 and 22 are located at some distance and may comprise cores 31 FIG. 10 to avoid mutual undesired influence as far as possible. Because of this construction with the coil 19 covering the complete circumference of the transmission belt 13 a continuous supply of the supply coil 21 and a continuous detection of the detection coil 22 can be realized with rotating transmission belt 13. In that way a dynamic measurement is performed.

It will be clear that within the scope of the invention many variants are conceivable which are considered to be within the scope of the invention. For instance, instead of diodes also transistors may be applied and instead of two LC-circuits a multiple of LC-circuits can be applied. Furthermore the coils and cores can, without any objection, have a cylindrical shape.

We claim:

1. A system for measuring forces, deformations and movements which appear in dynamic endless organs such as driving belts, driving chains, transmission belts, conveyor belts etc, comprising:
    at least one sensor attached to the endless organ, wherein an electrical characteristic of the sensor varies in accordance with physical variation of the endless organ;
    a measuring coil comprising an electrical conductor for mechanical attachment to said endless organ, said coil being electrically coupled to said sensor;
    a capacitor for mechanical attachment to said endless organ and electrically coupled to said measuring coil forming an LC-circuit; and
    a detection circuit including a stationary detection coil which is inductively coupled to said measuring coil, wherein variations in the electrical characteristic of the sensor cause a variation in the inductive coupling between the detection coil and the measuring coil.

2. A system according to claim 1, whereby the at least one sensor, the measuring coil and the capacitor are the only components of the system which are mechanically attached to the endless organ.

3. A measuring system according to claim 1, wherein the sensor comprises a strain gauge.

4. A measuring system according to claim 1, wherein the sensor comprises a resistor.

5. A measuring system according to claim 1, further comprising a power supply source electrically connected to a stationary supply coil which is inductively coupled to the measuring coil.

6. A measuring system according to claim 5, whereby the power supply source generates an AC current in the LC-circuit.

7. A measuring system according to claim 6, whereby the AC current is sinusoidal.

8. A measuring system according to claim 5, wherein at least one of the supply coil and the detection coil has an annular shape.

9. A measuring system according to claims 5, wherein the power supply coil and the detection coil comprise a core.

10. A measuring system according to claim 9, whereby the core has an annular shape.

11. The system of claim 5, wherein the stationary supply coil and the stationary measuring coil are arranged so that a direct inductive coupling between the stationary supply coil and the stationary measuring coil is essentially prevented.

12. A measuring system according to claim 1, whereby the measuring system comprises two or more LC-circuits.

13. A measuring system according to claim 12, whereby each LC-circuit has its own power supply and/or detection unit.

14. A measuring system according to claim 12, whereby the measuring circuit is embodied for sequentially measuring a number of variables.

15. A measuring system according to claim 14, whereby one or more LC-circuits comprise one or more rectifiers, such as diodes or transistors.

16. A measuring system according to claim 14, whereby in the LC-circuits a high frequency measuring signal is superposed onto a low frequency Ac voltage.

17. A measuring system according to claim 1, whereby the LC-circuit comprises two or more subsystems, whereby each subsystem comprises a capacitor and a rectifier.

18. A measuring system according to claim 17, for application in combination with a transmission belt.

19. A measuring system according to claim 18 for application in combination with a transmission belt whereby transversal elements are attached to one or more carrier, whereby the sensors are attached to one or more of said transversal elements.

20. A measuring system according to claim 1, wherein the coil of the LC-circuit comprises at least one winding, each said winding traversing a length of the endless organ.

21. A measuring system according to claim 20, wherein the coil of the LC-circuit is integral with the endless organ.

22. A measuring system according to claim 1, whereby the LC-circuit is a feedback circuit.

23. A system for measuring forces, deformations and movements which appear in dynamic endless organs such as driving belts, driving chains, transmission belts, conveyor belts etc, comprising:
    an LC circuit attached to the endless organ, the LC circuit comprising an inductive element including an electrical conductor mechanically attached to said endless organ, the LC circuit further comprising a capacitive element mechanically attached to said endless organ, wherein an electrical characteristic of the LC circuit varies in accordance with physical variation of the endless organ; and
    a detection circuit including a stationary detection coil which is inductively coupled to said inductive element, wherein variations in the electrical characteristic of the LC circuit cause a variation in the inductive coupling between the detection coil and the inductive element.

24. The system of claim 23, wherein the inductive element comprises an intermediate coil of at least one winding, each said winding traversing a length of the endless organ.

25. The system of claim 25, wherein a capacitance of the capacitive element varies in accordance with the physical variation of the endless organ.

26. The system of claim 25, wherein the dielectric constant of the capacitive element varies in accordance with the physical variation of the endless organ.

27. The system of claim 24, wherein an inductance of the inductive element varies in accordance with the physical variation of the endless organ.

28. The system of claim 24, further comprising a power source electrically connected to a stationary supply coil, the stationary supply coil being inductively coupled to the intermediate coil.

29. The system of claim 28, wherein the stationary supply coil and the stationary measuring coil are arranged so that a direct inductive coupling between the stationary supply coil and the stationary measuring coil is essentially prevented.

* * * * *